United States Patent

[11] 3,603,172

[72] Inventor Jeffrey Hall
 Huddersfield, England
[21] Appl. No. 780,779
[22] Filed Dec. 3, 1968
[45] Patented Sept. 7, 1971
[73] Assignee Houdaille Industries, Inc.
 Buffalo, N.Y.
[32] Priority Dec. 12, 1967
[33] Great Britain
[31] 56365/67

[54] DAMPER
 16 Claims, 4 Drawing Figs.
[52] U.S. Cl. .................................................. 74/574,
 188/1 B
[51] Int. Cl. ........................................... F16f 15/12,
 F16f 7/10

[50] Field of Search ........................................... 74/574;
 188/1 B

[56] References Cited
 UNITED STATES PATENTS
 3,448,830 6/1969 Desmond ...................... 188/1 B
 Primary Examiner—Duane A. Reger
 Attorney—Hill, Sherman, Meroni, Gross & Simpson ABSTRACT: A torsional vibration damper has several important features, including an elastic spacer element which may provide tuning for the damper, which may serve as sealing means for the damper and which may provide spacing means between the inertia member and the housing. The damper housing may comprise members having radially extending portions seated in rabbets in the hub.

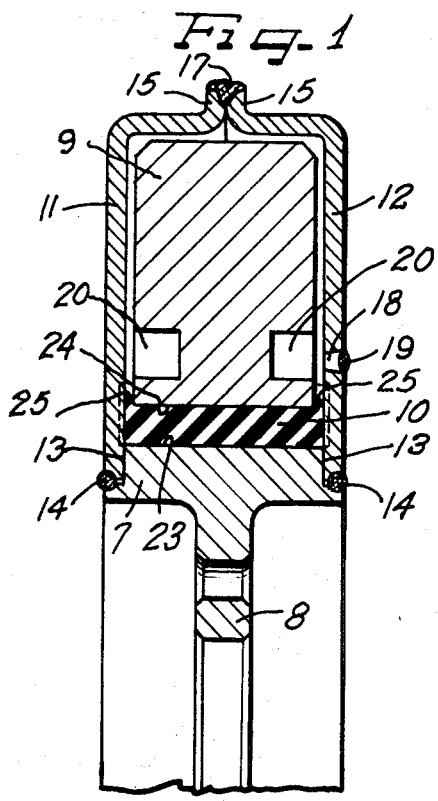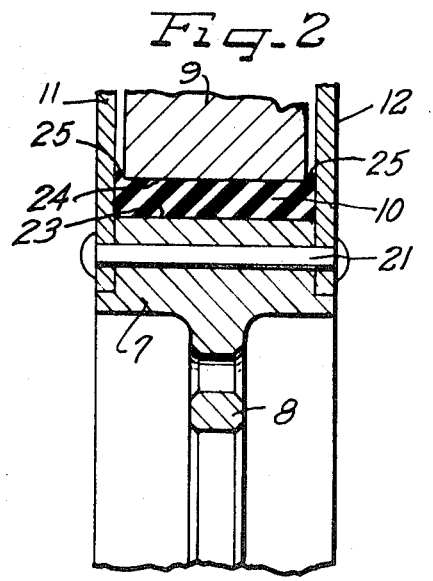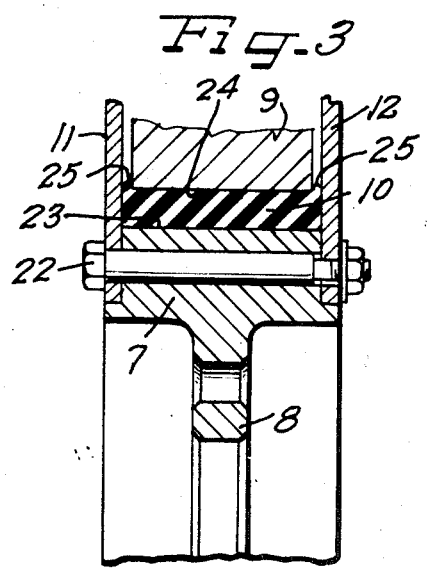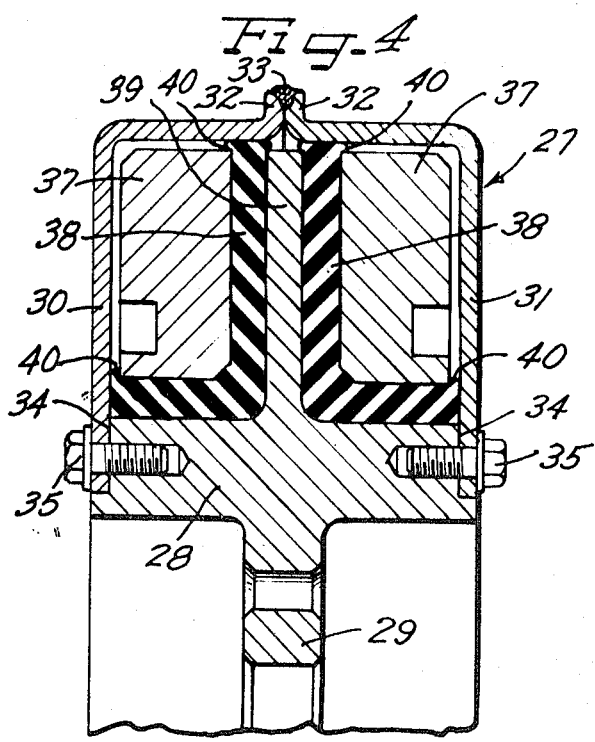
INVENTOR.
Jeffrey Hall

DAMPER

This invention relates to dampers of the type adopted, for example, to be mounted on the end of the crank shaft of a reciprocating piston internal combustion engine.

In torsional vibration dampers of the type employing viscous damping fluid between opposed shear film spaced working surfaces of the inertia mass and the housing, one of the problems has been to maintain the surfaces of the members against rubbing upon one another. Another problem has been to overcome unusual or critical vibrational nodes in the crank shaft and desirably overcome by tuning the damper to the particular vibrational frequency.

The foregoing problems are readily met by a damper according to the principles of the present invention in which the inertia mass is bonded by an elastomeric element to a hub and with portions of the elastomeric element providing spacers between adjacent working surfaces of the inertia member and the housing.

Another problem which is encountered in curing the elastomeric element as by vulcanization to bond the same to the inertia mass and the hub is that some of the material may lap over onto a working surface of the inertia member.

In accordance with the principles of the present invention the excess overlapping material may be trimmed away, but leaving some of such material to serve as a spacer and a seal between the adjacent working surface of the inertia member and the housing of the damper.

It is accordingly, an object of the present invention to provide a new and improved tuned torsional viscous vibration damper.

Another object of the invention is to provide a tuned viscous vibration damper having an elastic tuning element which serves also as a spacer for the inertia mass with respect to the housing of the damper.

A further object of the invention is to provide a new and improved damper construction in which an elastic tuning element also provides a seal against leakage of viscous damping fluid from within the damper.

Other objects, features and advantages of the present invention will be readily apparent from the following detailed description of certain exemplary embodiments thereof taken in conjunction with the accompanying drawing in which:

FIG. 1 is fragmentary radial sectional detail view through a tuned torsional viscous vibration damper embodying features of the invention;

FIG. 2 is a fragmentary sectional view similar to FIG. 1 but showing a modification;

FIG. 3 is a similar sectional view showing another modification; and

FIG. 4 is a similar sectional view showing yet another modification.

One reference to FIG. 1, a torsional vibration damper 5 embodying features of the invention comprises a generally ring-shaped hub 7 having a radially inwardly extending flange 8 by which the damper is adapted to be attached to one end of or to a flange on a rotary member subject to torsional vibrations, such as a crankshaft of an internal combustion engine and more particularly a reciprocating piston engine. Mounted in spaced concentric relation about the hub 7 is a ring shape inertia mass 9 connected in spaced relation to the hub by a tuning spring elastic element 10 which is of complementary ring shape and is bonded to the confronting radially outwardly facing surface of the hub 7 and the radially inwardly facing surface of the inertia ring 9 and is of such mass and resilient quantities relative to the inertia mass and the vibratory member on which the damper is to be mounted as to damp vibrations of a critical node or frequency.

Mounted on the hub 7 and enclosing the inertia mass 9 is a housing which may desirably be constructed of suitable gauge sheet-metal parts, comprising complementary half shells 11 and 12 each of which comprises a radial wall portion having its inner margin seated in a respective rabbet 13 grooved in the adjacent end of the hub 7, with the edge of the housing member secured, in this instance, permanently to the hub as by means of welding 14. At their outer perimeters, the housing shell member 11 and 12 have respective axially extending flange portions with radially extending confronting respective joint flanges 15 which are hermetically joined as by means of welding 17.

By having the width between the axially facing surfaces of the rabbets 13 sufficiently greater than the width of the inertia mass 9, and the inside faces of the housing members 11 and 12 conforming to the width of the hub portion between the inner margins of the housing member a shear film spaced relationship is accommodated between the confronting working faces of the sides of the inertia mass and the housing. A shear film spaced relationship between the outer perimeter of the inertia mass 9 and the housing is predetermined also. The viscous damping fluid is filled into the working chamber in the housing through one or more filler openings 18 which are then sealed by a plug 19. To increase the fluid capacity of the chamber, the inertia ring 9 may have one or more reservoir spaces 20. The damping fluid may be silicone liquid of suitable viscosity, i.e. $0.5 \times 10^6$ to $1 \times 10^6$ centistokes.

Instead of welding the housing shell members 11 and 12 to the hub 7 as shown in FIG. 1, the inner margins of the housing members may be secured to the hub member by means such as rivets 21 as shown in FIG. 2.

If preferred, the inner margins of the housing member 11 and 12 may be secured to the hub 7 by means such as bolts 22 as shown in FIG. 3.

In the assembling of the arrangements shown in FIGS. 1, 2 and 3, the inertia mass 9 and the hub member 7 are held in the relative position thereof shown in the drawing with a suitable quantity or blank of the material of the elastic tuning and spacer element 10 in place in the space therebetween. The material of the elastic element is then cured, as by heating and vulcanizing the same whereby it fills the space and bonds to confronting faces 23 and 24 of respectively the hub and the inertia mass. To permit relief or flash of excess material during curing, mold surfaces may be applied to the axially facing surfaces of the rabbets 13 whereby the mold surfaces are held spaced from the axially facing working surfaces of the inertia mass member 9. After molding has been completed, excess flash is removed from the axial faces of the inertia member except that a small amount of the material of the elastic element is desirably left as an annular sealing and spacer flange 25 to extend into the spaced between the inner margins of the inertia ring 9 and the housing members 11 and 12. If preferred, the axial dimension of the inertia ring may be molded to a slightly greater length than in the final assembly, as indicated in dash outline in FIG. 1 and after trimming back of the flash, and seating of the housing members 11 and 12 in the rabbets 13, the material of the elastic element 10 may be compressed to the full line position shown whereby the sealing and spacer ring flanges 25 will result from the flow of the compressed material into the working spaces between the inertia member and the housing. In any event, the flanges 25 maintain an axially spaced relation of the inertia ring member 9 in the housing chamber and the tuning spring elastic element 10 maintains a concentric spaced relation of the inertia ring with respect to the radially facing working surfaces of the housing and the inertia member.

After the cover members 11 and 12 have been applied and secured together and onto the hub and the viscous damping fluid filled into the working chamber, and the plugs 19 applied, the damper is ready for use. The elastic element 10 not only serves as a spacer for the inertia mass 9 but also acts as a seal to prevent egress of the viscous fluid from the damper and as a tuning spring.

In FIG. 4 a damper 27 according to the invention comprises a ring shaped hub 28 having a centrally located radially extending attachment flange 29. The cover or housing comprises two complementary shell members 30 and 31 which have outer terminal joint flanges 32 welded hermetically as at 33. At their inner margins the cover members 30 and 31 are seated in respective rabbets 34 in the opposite ends of the hub 28 and may be secured in any suitable manner, as by means of screws 35. In this instance two similar inertia ring members 37 are mounted by being bonded to respective generally L-shaped cross section annular elastic tuning elements 38 at surfaces thereof which oppose spaced confronting surfaces of the hub 28 which is provided with a radially outwardly extending central annular attachment fin of flange 39 for this purpose. In this instance the opposite ends of each of the elastic tuning elements 38 engage sealingly with the housing and have sealing and spacer flanges 40 extending a limited distance into the shear film spacings between the confronting working surfaces of the inertia ring members and the housing members.

Assembly of the arrangement shown in FIG. 4 is similar to assembly of the arrangements shown in FIGS. 1–3.

The present invention thus provides a combined rubber damper and viscous damper which is, in fact, a viscous damper with a tuned inertia mass.

The damper of the invention is advantageous in that the surfaces of the inertia member, cover member and hub member which are not bonded to the elastic element are accessible until the hub member and the cover member are assembled, thus enabling excess elastic material to be removed from those surfaces to which it is not intended to be bonded. If this scrap is not removed, then the surfaces available for shear action are reduced with a corresponding reduction in the damping effect of the unit.

Another advantage of the present invention is that, since the inertia mass is located by the elastic element, larger clearances between the inertia mass and the cover member may be possible than in purely viscous dampers. For example clearances of upwards of 0.020 inches may be used. Also, because there is less chance of fouling between the inertia mass and the cover, due to the extra location of the inertia member provided by the elastic element, the casing may be made from thinner materials than are generally necessary in purely viscous dampers. The use of thinner materials results in less hub inertia.

In any form of the invention the hub member and the cover member may be manufactured from many materials, for example steel or cast iron. Where cast iron is used, the hub member and the cover member should be bolted, rivetted or screwed together. Where steel is used, welding may also be used to attach the cover member to the hub member. The inertia mass is preferably made from cast iron or steel. If desired the cover member may be a multiple part member, and in one preferred embodiment of the invention the cover member is a two part member.

In all forms of the invention, the surfaces of the elastic elements engaging the housing sealingly are desirably in sliding engagement therewith such that viscous damping relative torsional movements of the inertia mass and the housing are facilitated in the normal operation of the damper and excellent elastic tuning is attained.

It will be appreciated that many modifications are possible in the arrangements shown in the drawings. For example the elastic elements of FIGS. 1–3 could be L-shaped cross section, the chamber being defined between a cover member of L-shaped cross section and a hub member including a flange which would take the place of one of the radially extending walls of the cover member in FIGS. 1–3. The L-shaped elastic element could be located between the inertia mass and the hub member or between the inertia mass and the cover member.

I claim as my invention:

1. A torsional vibration damper comprising:
   a housing having a hub and enclosing an annular working chamber;
   an inertia ring in said working chamber having an inner perimeter spaced from said hub and having at least oppositely axially facing working surfaces in shear film spaced relation to confronting working surfaces of said housing within said chamber;
   a ring-shaped elastic spacer and tuning element within the space between the hub and the inertia ring;
   viscous damping fluid in said working chamber;
   and annular spacer flanges of said elastic element extending into and maintaining the shear film spaces between the axial faces of the inertia ring and the housing.

2. A damper according to claim 1, said elastic element and said flanges serving as sealing means against leakage of damping fluid from said housing and being unattached to the housing except at said hub.

3. A torsional vibration damper comprising:
   a housing having members attached together at a joint and providing an annular working chamber;
   viscous damping fluid in said chamber;
   an inertia ring in said chamber and having working surfaces in shear film-spaced relation to surfaces of the housing in said chamber, having regard to the viscosity of said fluid;
   and an annular elastomeric element maintaining a spaced relation between said housing and said inertia ring and sealing said joint against egress of said fluid.

4. A torsional vibration damper comprising:
   a housing having a hub and enclosing an annular working chamber;
   an inertia ring in said working chamber having an inner perimeter spaced from said hub and having at least oppositely axially facing working surfaces in shear film-spaced relation to confronting working surfaces of said housing within said chamber;
   an elastic spacer and tuning element within the space between the hub and the inertia ring;
   viscous damping fluid in said working chamber; and
   spacer flanges of said elastic element extending into and maintaining the shear film spaces between the axial faces of the inertia ring and the housing;
   said hub having rabbets and the housing comprising members having radially extending portions seated in said rabbets;
   said rabbets having respective oppositely axially facing surfaces which are spaced apart substantially equal to the spacing of the housing portions and greater than the width of the inertia ring and said elastic element extending the full width of said hub portion between said rabbet faces.

5. A damper according to claim 4, in which said housing portions comprise complementary shell members having outer peripheral joining flanges which are welded together to seal said chamber hermetically.

6. A torsional vibration damper comprising:
   a housing having a hub and enclosing an annular working chamber;
   an inertia ring in said working chamber having an inner perimeter spaced from said hub and having at least oppositely axially facing working surfaces in shear film-spaced relation to confronting working surfaces of said housing within said chamber;
   an elastic spacer and tuning element within the space between the hub and the inertia ring;
   viscous damping fluid in said working chamber;
   spacer flanges of said elastic element extending into and maintaining the shear film spaces between the axial faces of the inertia ring and the housing;
   said hub having rabbets;
   said housing comprising members seated in said rabbets; and
   means selected from welding, rivets, and bolts, securing said housing members in said rabbets.

7. A torsional vibration damper comprising:
   a housing having a hub and enclosing an annular working chamber;
   an inertia ring in said working chamber having an inner perimeter spaced from said hub and having at least oppositely axially facing working surfaces in shear film-spaced relation to confronting working surfaces of said housing within said chamber;

a ring-shaped elastomeric spacer element within the space between the hub and the inertia ring;

said element being normally wider than the space between said axially facing working surfaces and being maintained under axial compression by engagement by and between portions of the housing providing said confronting working surfaces.

8. A damper according to claim 7, including spacer flanges of said spacer element extending into the shear film spaces between the working surfaces of the inertia ring and the housing and thereby maintaining said shear film spaces.

9. A damper according to claim 7, the opposite ends of said elastomeric element being in freely slidable relation with the portions of the housing maintaining the element under compression.

10. A damper according to claim 7, in which said housing has flange portions extending into face-to-face engaged relation to end portions of said hub, and said elastomeric spacer element by virtue of its compressed condition serving as a seal against leakage of the damping fluid from said chamber through the joints between said flange portions and said hub.

11. A torsional vibration damper comprising:

a housing having a hub and enclosing an annular working chamber;

an inertia ring in said working chamber having an inner perimeter about said hub and having not only oppositely axially facing working surfaces in shear film-spaced relation to confronting working surfaces of said housing within said chamber but also an outer perimeter working surface in shear film-spaced relation to a confronting inner perimeter working surface of said housing;

said hub having rabbets and the housing comprising members having radially extending portions seated in said rabbets, said rabbets having respective oppositely axially facing surfaces which are spaced apart substantially equal to the spacing of the housing portions and greater than the width of the inertia ring so as to afford said shear film spacing between said confronting surfaces and the axially facing working surfaces of the inertia ring when the radially extending portions are fixedly secured against said hub, and the inner ends of said housing portions seating against radially facing portions of said rabbets and thus assuring concentricity of said inner perimeter of the housing with respect to the outer perimeter of the inertia ring.

12. A damper according to claim 11, including elastomeric spacer and sealing ring means engaged between said hub and said inertia ring and said housing portions.

13. A torsional vibration damper comprising:

a housing defining an annular working chamber;

an inertia ring in said working chamber having at least certain surfaces thereof in spaced parallel shear film-spaced relation to confronting working surfaces of said housing within said chamber;

a viscous damping fluid in said chamber; and an elastomeric ring-shaped spacer between another surface of said inertia ring and said housing and having opposite ends sealingly engaging said confronting surfaces of the housing.

14. A damper according to claim 13, including annular flanges of said ring-shaped spacer projecting a limited distance into the shear film spaces between said working surfaces.

15. A damper according to claim 13, in which said inertia ring has a radially facing surface, and said spacer is located along said radially facing surface.

16. A damper according to claim 13, in which said working surfaces of the inertia ring and the housing face both axially and radially, said spacer being of L-shape and located between other axially and radially facing surfaces of the inertia ring and the housing.

UNITED STATES PATENT OFFICE
CERTIFICATE OF CORRECTION

Patent No. 3,603,172　　　　　　　　Dated September 7, 1971

Inventor(s) Jeffrey Hall

It is certified that error appears in the above-identified patent and that said Letters Patent are hereby corrected as shown below:

>　　Column 1, line 4, for "adopted" read --adapted--;
> line 56, for "One" read --On--; lines 68 and 69,
> for "quantities" read --qualities--. Column 2, line
> 29, for "member" read --members--; line 38, place
> --,-- (comma) after "same"; line 48, for "spaced"
> read --space--.

Signed and sealed this 29th day of August 1972.

(SEAL)
Attest:

EDWARD M. FLETCHER, JR.　　　　　　　ROBERT GOTTSCHALK
Attesting Officer　　　　　　　　　　Commissioner of Patents